US009187997B2

(12) United States Patent
Cramer

(10) Patent No.: US 9,187,997 B2
(45) Date of Patent: Nov. 17, 2015

(54) SYSTEM, METHOD AND APPARATUS FOR REDUCING SHOCK AND VIBRATION IN DOWN HOLE TOOLS

(71) Applicant: David Stuart Cramer, Okotoks (CA)

(72) Inventor: David Stuart Cramer, Okotoks (CA)

(73) Assignee: GENERAL DOWNHOLE TECHNOLOGIES, LTD., Calgary (CA)

( * ) Notice: Subject to any disclaimer, the term of this patent is extended or adjusted under 35 U.S.C. 154(b) by 377 days.

(21) Appl. No.: 13/763,248

(22) Filed: Feb. 8, 2013

(65) Prior Publication Data

US 2013/0206395 A1    Aug. 15, 2013

Related U.S. Application Data

(60) Provisional application No. 61/633,458, filed on Feb. 13, 2012.

(51) Int. Cl.
*E21B 17/07* (2006.01)
*E21B 47/01* (2012.01)
*F16F 7/00* (2006.01)

(52) U.S. Cl.
CPC ............. *E21B 47/011* (2013.01); *E21B 17/07* (2013.01); *F16F 7/00* (2013.01)

(58) Field of Classification Search
CPC ....... E21B 17/07; E21B 19/09; E21B 31/107; E21B 47/01; E21B 47/011; F16F 7/00; F16F 7/09; F16F 7/116; F16F 7/095; B60G 13/00; B60G 13/04
See application file for complete search history.

(56) References Cited

U.S. PATENT DOCUMENTS

| 1,418,380 | A |   | 6/1922  | Keck            |         |
|-----------|---|---|---------|-----------------|---------|
| 2,147,491 | A |   | 2/1939  | Le Bus          |         |
| 2,373,508 | A | * | 4/1945  | Rush ............. | 267/200 |
| 2,459,537 | A | * | 1/1949  | Oberstadt ...... | 188/129 |
| 2,481,006 | A | * | 9/1949  | Dath ............. | 188/129 |
| 2,497,892 | A | * | 2/1950  | Adolph .......... | 2/68    |
| 2,819,894 | A | * | 1/1958  | Tack ............. | 267/209 |
| 2,938,710 | A |   | 5/1960  | Tannehill       |         |
| 3,083,549 | A |   | 4/1963  | Benson          |         |
| 3,162,025 | A |   | 12/1964 | Benson          |         |
| 3,733,853 | A |   | 5/1973  | Sutliff et al.  |         |
| 3,947,009 | A |   | 3/1976  | Nelmark         |         |
| 4,630,809 | A |   | 12/1986 | Duckworth       |         |

(Continued)

FOREIGN PATENT DOCUMENTS

CN    2700557 Y    6/2004
CN    101864907 A  5/2010

(Continued)

OTHER PUBLICATIONS

APS Technology: "MWD Vibration Isolators" http://www.aps-tech.com/products/vibration/mwd-vibration-isolators.php, 2012.

(Continued)

*Primary Examiner* — Yong-Suk (Philip) Ro
(74) *Attorney, Agent, or Firm* — Abel Law Group, LLP

(57) ABSTRACT

A snubber for reducing shock and vibration in down hole tools includes a housing having an axis and a chamber. A piston is mounted in the chamber for axial movement therein. The piston includes a shaft extending therefrom to an exterior of the housing. An axial spring element is mounted between the piston and the housing. Both the piston and the chamber include non-cylindrical portions.

17 Claims, 7 Drawing Sheets

(56) References Cited

U.S. PATENT DOCUMENTS

| | | |
|---|---|---|
| 4,636,180 A | 1/1987 | Runkle |
| 4,779,852 A | 10/1988 | Wassell |
| 4,901,806 A | 2/1990 | Forrest |
| 4,936,394 A | 6/1990 | Ohtsu |
| 4,982,801 A | 1/1991 | Zitka et al. |
| 5,569,089 A | 10/1996 | Singnorelli |
| 5,833,541 A | 11/1998 | Turner et al. |
| 6,203,435 B1 | 3/2001 | Falgout, Sr. |
| 6,837,315 B2 | 1/2005 | Pisoni et al. |
| 6,916,248 B1 | 7/2005 | Burgess |
| 7,044,219 B2 | 5/2006 | Mason et al. |
| 7,097,565 B2 | 8/2006 | Mazziotti et al. |
| 7,186,182 B2 | 3/2007 | Wenzel et al. |
| 7,690,425 B2 | 4/2010 | Giacomino |
| 8,033,917 B2 | 10/2011 | Prill, Jr. et al. |
| 8,062,140 B2 | 11/2011 | Wall et al. |
| 8,157,025 B2 | 4/2012 | Johnson |
| 8,342,970 B2 | 1/2013 | Altimas et al. |
| 2010/0313692 A1 | 12/2010 | Wenzel |
| 2011/0005839 A1 | 1/2011 | Marchand et al. |

FOREIGN PATENT DOCUMENTS

| | | |
|---|---|---|
| CN | 201614926 U | 10/2010 |
| CN | 201874554 U | 11/2010 |
| WO | 2012039700 A1 | 3/2012 |

OTHER PUBLICATIONS

International Search Report, PCT/CA2014/050020, filed Jan. 14, 2014.

* cited by examiner

SYSTEM, METHOD AND APPARATUS FOR REDUCING SHOCK AND VIBRATION IN DOWN HOLE TOOLS

This application claims priority to and the benefit of U.S. Provisional Patent Application No. 61/633,458, filed Feb. 13, 2012, and is incorporated herein by reference in its entirety.

BACKGROUND OF THE INVENTION

1. Field of the Disclosure

The present invention relates in general to absorbing vibration and impacts during down hole drilling and, in particular, to a system, method and apparatus for protecting measurement while drilling devices.

2. Description of the Related Art

In the oil and gas industry, there is always a need to make down hole electronic devices more reliable. Down hole electronic devices that are used while drilling operate at high levels of both vibration and temperature. These environmental factors cause down hole electronic devices to fail at a much higher rate than surface devices. Any failure of a down hole electronic device is costly since drilling operations typically must be stopped and the down hole tools must be removed from the hole. Such operations can require a few hours to a few days, and can cost thousands or hundreds of thousands of dollars. Accordingly, any device that reduces the frequency at which down hole failures occur is desirable.

Most down hole electronic devices are operated with some means (e.g., a snubber) of isolating them from the shock and vibration that is present in a drilling situation. Devices such as snubbers provide some levels of shock and vibration protection. However, conventional devices are limited by one or more of the following constraints: their size must be relatively small, all elements of the device must be able to withstand temperatures of at least 150 degrees C., and the device must not expose the system to any additional risk (e.g., the increased movement of the device must not add to the tendency for wire harnesses break prematurely).

Measurement while drilling (MWD) devices are designed to work in conditions of high vibration and temperature, and also within a very high flow rate of an abrasive slurry called drilling mud. Because of this, every external part of the system has a finite life span. The wearing out of and replacement of these elements is a significant contributor to the material cost of operating MWD systems. Larger parts of the expensive materials needed for such operations are more costly. In order for an operator to be competitive in the marketplace, it is imperative that the MWD tools be no larger than they need to be. Moreover, many MWD operators employ systems based on an industry-standard vibration absorber or snubber. See, e.g., http://www.aps-tech.com/products/vibration/mwd-vibration-isolators.php. Thus, it is desirable for new or improved designs to fit within the size constraints imposed by that design.

The temperature requirement is significant because the majority of compliant plastic materials (polyurethane, for example) start to lose their mechanical properties at 100 degrees C. This means that some preferred means of absorbing shock and vibration are disqualified.

The need for the device to avoid introducing additional risk is fairly self-evident. The device cannot damage the functionality of the MWD system in the event that it should fail. The device must be "fail safe" such that no damaging or costly system failure occurs. Thus, continued improvements in MWD shock and vibration dampening are desirable.

SUMMARY

Embodiments of a system, method and apparatus for reducing shock and vibration in down hole tools are disclosed. For example, an apparatus may comprise a housing having an axis and a chamber. A piston may be mounted in the chamber for axial movement therein. The piston may include a shaft extending therefrom to an exterior of the housing. An axial spring element may be mounted between the piston and the housing. Both the piston and the chamber may comprise non-cylindrical portions.

In another embodiment, an apparatus may comprise a housing having an axis and a chamber. A piston may be mounted in the chamber for axial movement therein. The piston may have a shaft extending therefrom to an exterior of the housing. An axial spring element may be mounted between the piston and the housing. The axial spring element may have a variable spring rate.

In still other embodiments, a down hole tool assembly may comprise a pressure barrel and a first component mounted inside the pressure barrel. A snubber may be mounted to the first component inside the pressure barrel. The snubber may comprise a housing having an axis and a chamber. A piston may be mounted in the chamber for axial movement therein. The piston may include a shaft extending therefrom to an exterior of the housing. An axial spring element may be mounted between the piston and the housing. Both the piston and the chamber may include non-cylindrical portions. A second component mounted the snubber opposite the first component.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figures 1A, 1B:
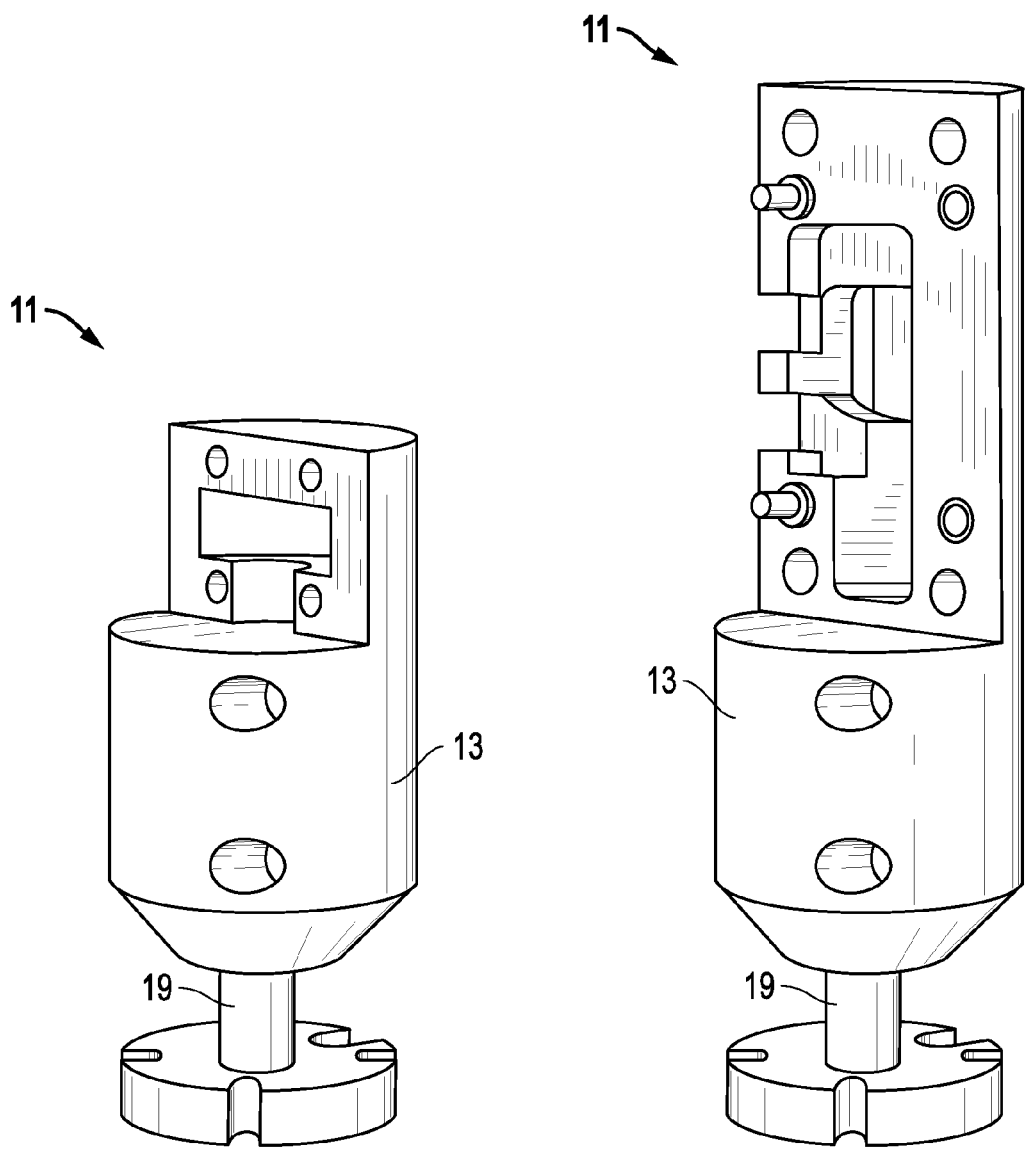
FIG. 1 includes isometric views of embodiments of an apparatus.

Embodiments of a system, method and apparatus for reducing shock and vibration in down hole tools are disclosed. As shown in FIG. 1, embodiments of the apparatus 11 may comprise a snubber (two snubbers are shown). The size and shape of the apparatus 11 may vary depending on the application. For example, in FIG. 1 the apparatus 11 on the left may be suitable for gamma probes, while the apparatus 11 on the right may be suitable for directional units.

Figure 2:
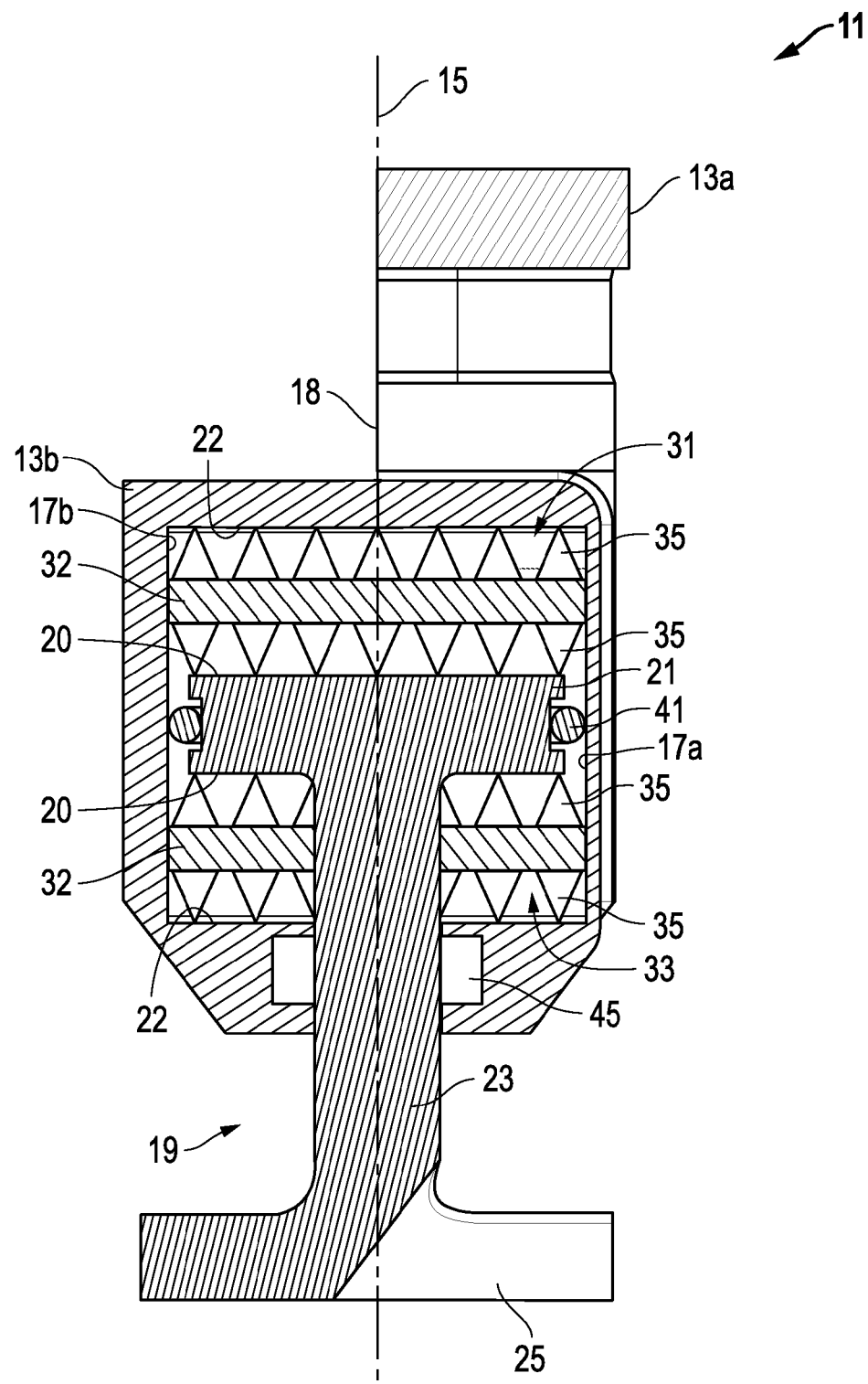
FIGS. 2 and 3 are sectional side and exploded isometric views, respectively, of other embodiments of an apparatus.
Figure 3:
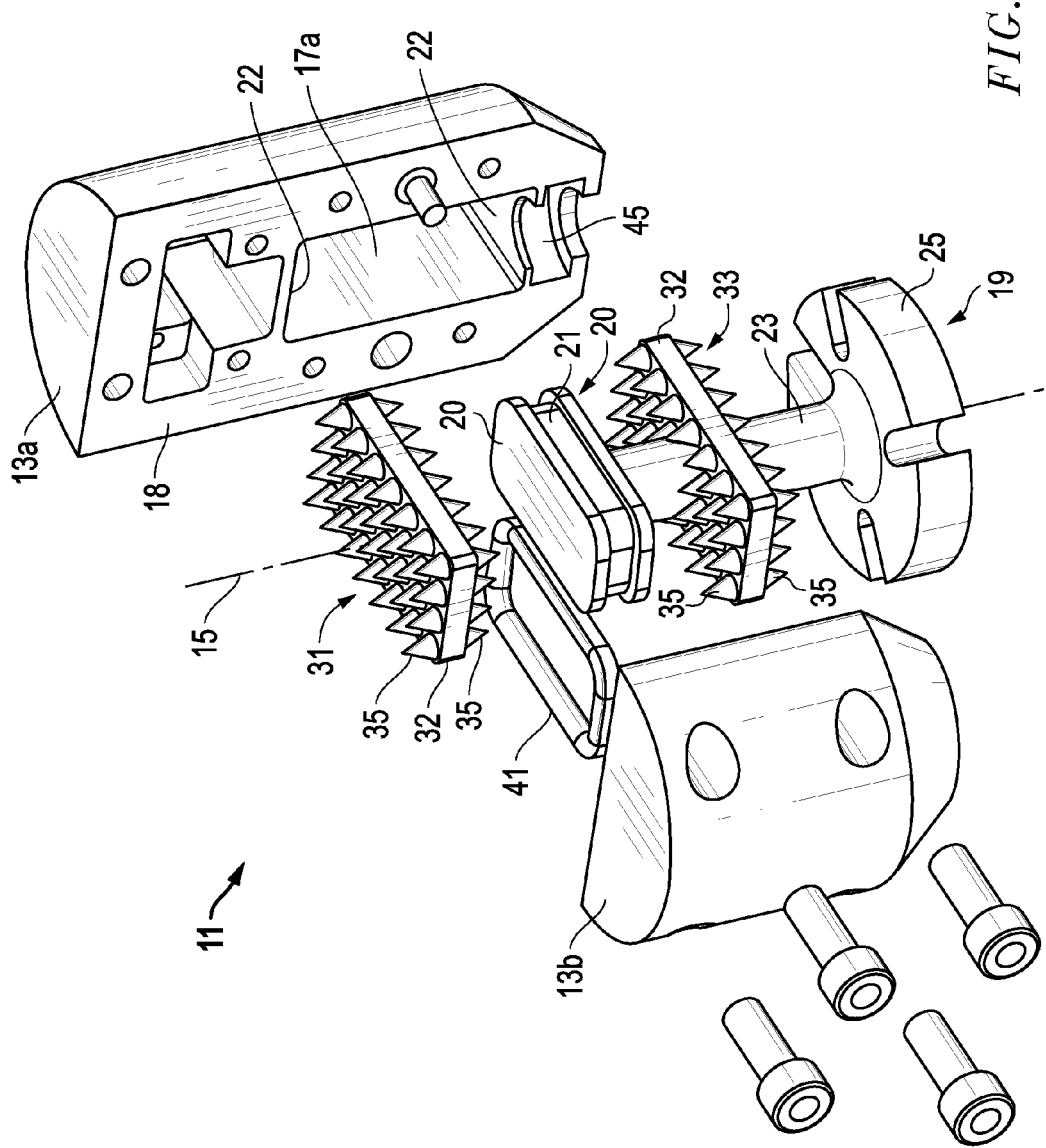

Referring now to FIGS. 2 and 3, embodiments of apparatus 11 may comprise a housing 13 having an axis 15 and a chamber 17. The housing 13 may comprise more than one component. For example, two components 13a, 13b are shown. In this example, the components 13a, 13b comprise chamber portions 17a, 17b, respectively. The housing 13 may comprise a generally cylindrical exterior body, as shown. Housing 13 also may include a mounting portion 18, which may be fastened or otherwise secured to another component, as described elsewhere herein.

A piston 19 may be mounted in the chamber 17 for axial movement therein. The piston 19 may be provided with a boss 21 for oscillation within chamber 17. A shaft 23 may extend from the boss 21 to an exterior of the housing 13. The shaft 23 may terminate in a mounting portion, such as a flange 25, which may be fastened or otherwise secured to another component, as described elsewhere herein.

In some embodiments, both the piston 19 and the chamber 17 may comprise non-cylindrical portions. For example, piston 19 may comprise the generally rectangular boss 21 shown. The boss 21 and chamber 17 may be complementary in shape. Embodiments of each of the non-cylindrical portions may include at least one flat side to restrict torsional rotation of the piston 19 about the axis 15 within the chamber 17. Each of the non-cylindrical portions may be polygonal in shape, such as triangular, rectangular, pentagonal, hexagonal, etc.

Embodiments of the apparatus 11 may include one or more axial spring elements 31, 33 (e.g., two shown). The axial spring elements 31, 33 may be located on opposite axial sides of the piston 19. The first axial spring element 31 may be positioned on a surface of the piston 19, while the second axial spring element 33 may be positioned around the shaft 23 (e.g., via a slit in the second axial spring element 33). The axial spring elements 31, 33 may be mounted between the piston 19 and the chamber 17 in the housing 13. In some versions, the axial spring elements 31, 33 may be positioned between the axial end faces 20 of the boss 21, and axial ends 22 of the chamber 17.

Some embodiments of axial spring elements 31, 33 may comprise a variable spring rate. The axial spring elements 31, 33 may have a continuously variable spring rate that is directly proportional to axial displacement of the piston 19. For example, the axial spring elements 31, 33 may have a lower spring rate at lower displacements of piston 19, and a higher spring rate at higher displacements of piston 19.

In some embodiments, the apparatus 11 may comprise a spring rate of about 1200 lb/in to about 5000 lb/in, with a 3 lb object oscillating at 2G's. In other versions, the spring rate may be less than about 60,000 lb/in, such as less than about 50,000 lb/in, less than about 40,000 lb/in, less than about 30,000 lb/in, less than about 20,000 lb/in, or even less than about 10,000 lb/in. Other embodiments of apparatus 11 may include a spring rate of at least about 100 lb/in, such as at least about 500 lb/in, or even at least about 1000 lb/in.

Still other embodiments of the axial spring elements 31, 33 may comprise an elastomer, such as a nitrile elastomer, a hydrogenated nitrile butadiene rubber (HNBR), etc. In some embodiments, the axial spring elements 31, 33 are not silicone-based. Some embodiments of axial spring elements 31, 33 may comprise a variable density, such as a variable density in the axial direction. The density of axial spring elements 31, 33 may be considered as variable since some embodiments are not solid within their volumetric envelopes. For example, the volumetric envelope of the axial spring element may contain both elastomer and air space within an interior of the volumetric envelope. The axial spring elements 31, 33 may not comprise a completely solid volume between the piston 19 and the chamber 17. The axial spring elements 31, 33 may be profiled to include space for air or other compressible gas within respective interiors of their volumetric envelopes.

In some versions, the volumetric envelopes of the axial spring elements 31, 33 may be sized to substantially fill the remaining space inside the chamber 17, with piston 19. Thus, in some embodiments, the axial spring elements 31, 33 are subjected only to compression and decompression, rather than axial motion with piston 19 inside chamber 17.

Figure 4:
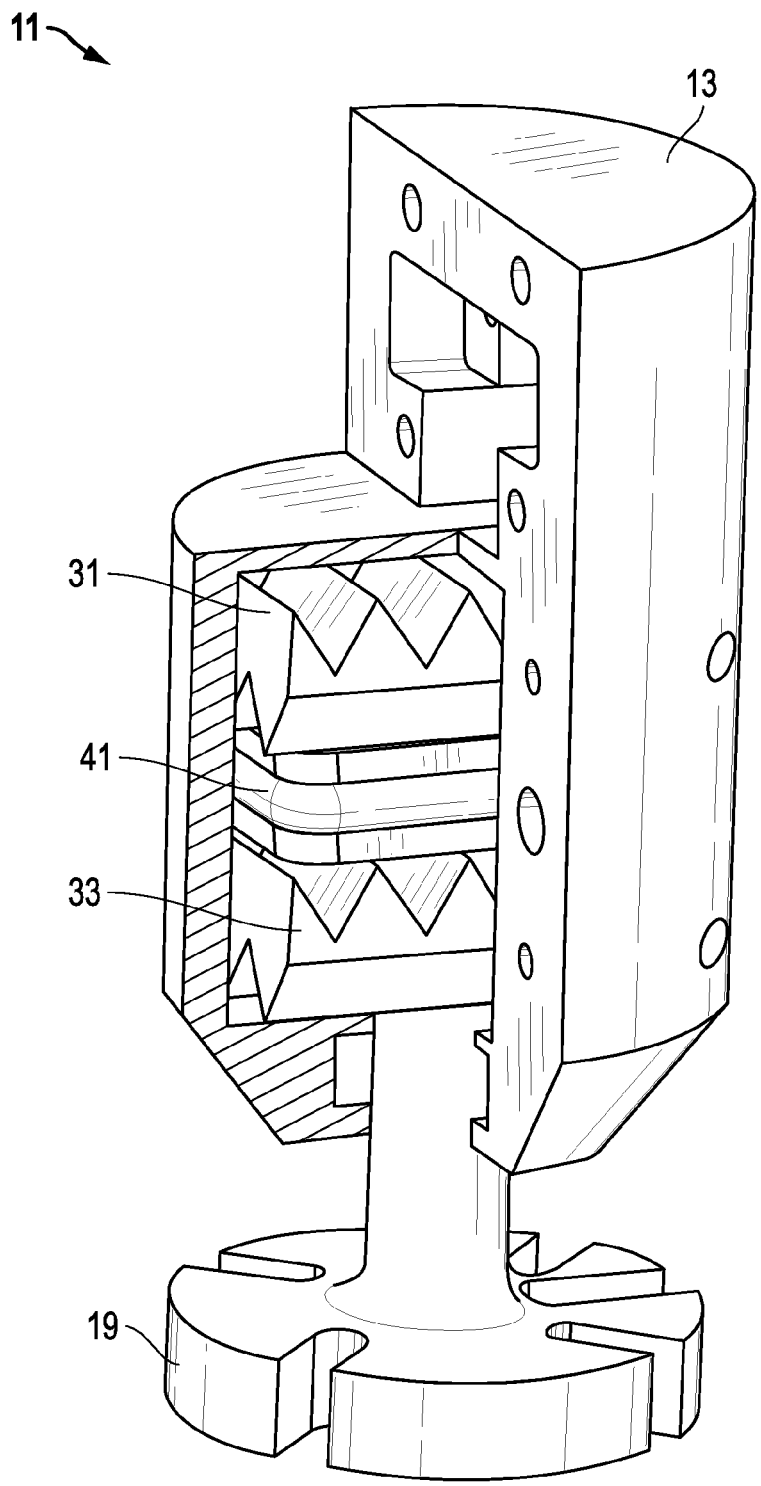
FIG. 4 is a partially sectioned, isometric view of another embodiment of an apparatus.

Additional embodiments of the axial spring elements 31, 33 may each comprise a body 32 and components 35. For example, the body 32 may comprise a solid, generally rectangular component, while the components 35 may comprise tapered protrusions or polygonal elements. Versions of the polygonal elements 35 may comprise cone-shaped (FIGS. 2 and 3), pyramid-shaped or prism-shaped (FIG. 4) protrusions extending in the axial direction. The polygonal elements 35 may be uniformly distributed and orthogonally arrayed.

Some versions of the polygonal elements 35 may be provided on one or both axial sides of the body 32 of each of the axial spring elements 31, 33. In some versions (FIG. 4), the polygonal elements 35 on each axial side of the axial spring elements 31, 33 may be oriented perpendicular to each other. Other embodiments of the polygonal elements 35 of the axial spring element 31 may be oriented in an opposite axial direction as the polygonal elements 35 of the second axial spring element 33. In some examples, the polygonal elements 35 of the axial spring element 31 may be radially orthogonal relative to the polygonal elements 35 of the second axial spring element 33. Some embodiments of the apparatus 11 do not include or comprise a coil spring.

Embodiments of the apparatus 11 may further comprise one or more radial spring elements 41. The radial spring element 41 and the axial spring elements 31, 33 may be formed from a same material or from different materials. The radial spring element 41 may be solid, and may comprise an O-ring in some versions.

Figure 5:
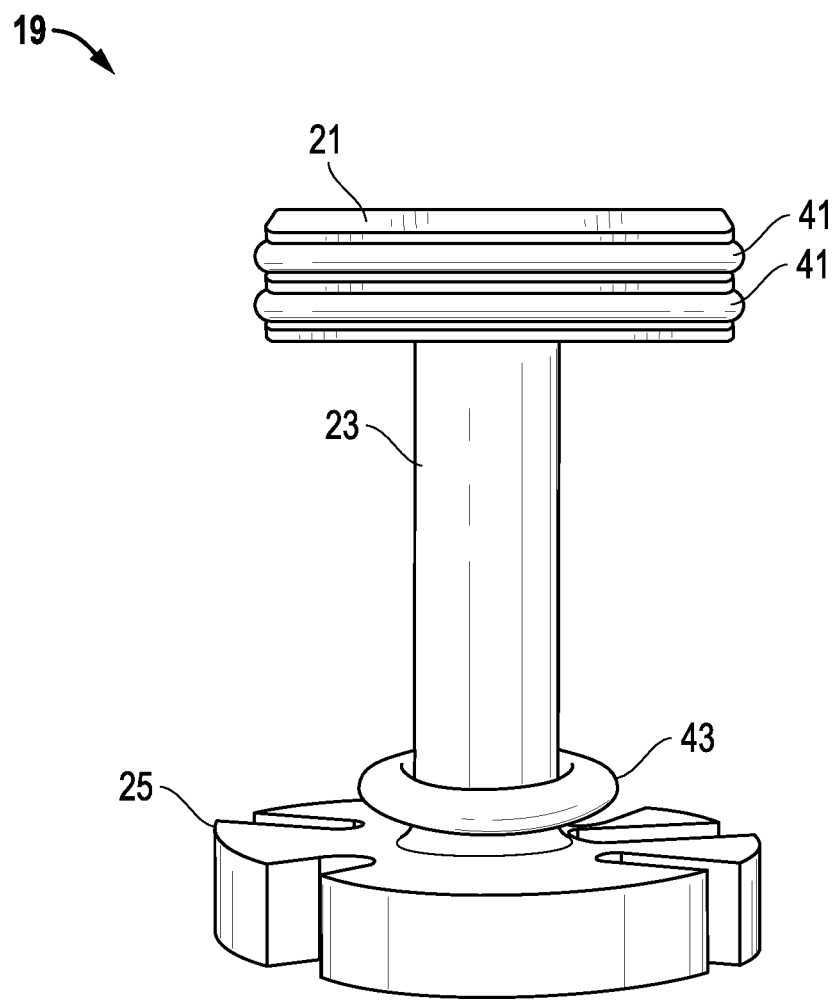
FIG. 5 is a front view of embodiments of components of an apparatus.

The radial spring element 41 may be mounted between the piston 19 and the chamber 17 in the housing 13, and may be configured for reciprocal axial motion therein. In FIG. 5, two radial spring elements 41 are shown, and they are axially spaced apart from each other. The radial spring elements 41 may be mounted to a radial surface of the boss 21 on piston 19. The radial spring elements 41 may seat in recesses on the radial surface of the boss, and the recesses may be separated by a partition, as shown in FIG. 5.

An additional seal 43, such as an O-ring, may be provided on shaft 23. Seal 43 may be positioned in a pocket 45 (FIGS. 2 and 3) formed in housing 13. Pocket 45 may be axially separated and spaced apart from chamber 17, as shown. Seal 43 provides protection against contamination for chamber 17 and its contents.

Figure 6:
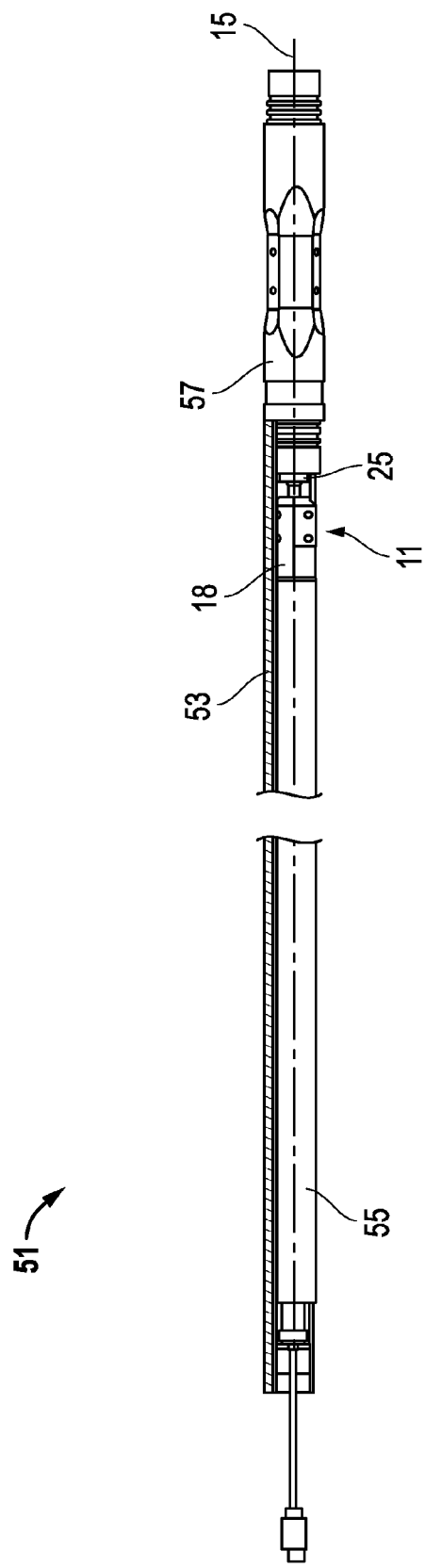
FIG. 6 is a sectional side view of an embodiment of a down hole tool assembly.
Figure 7:
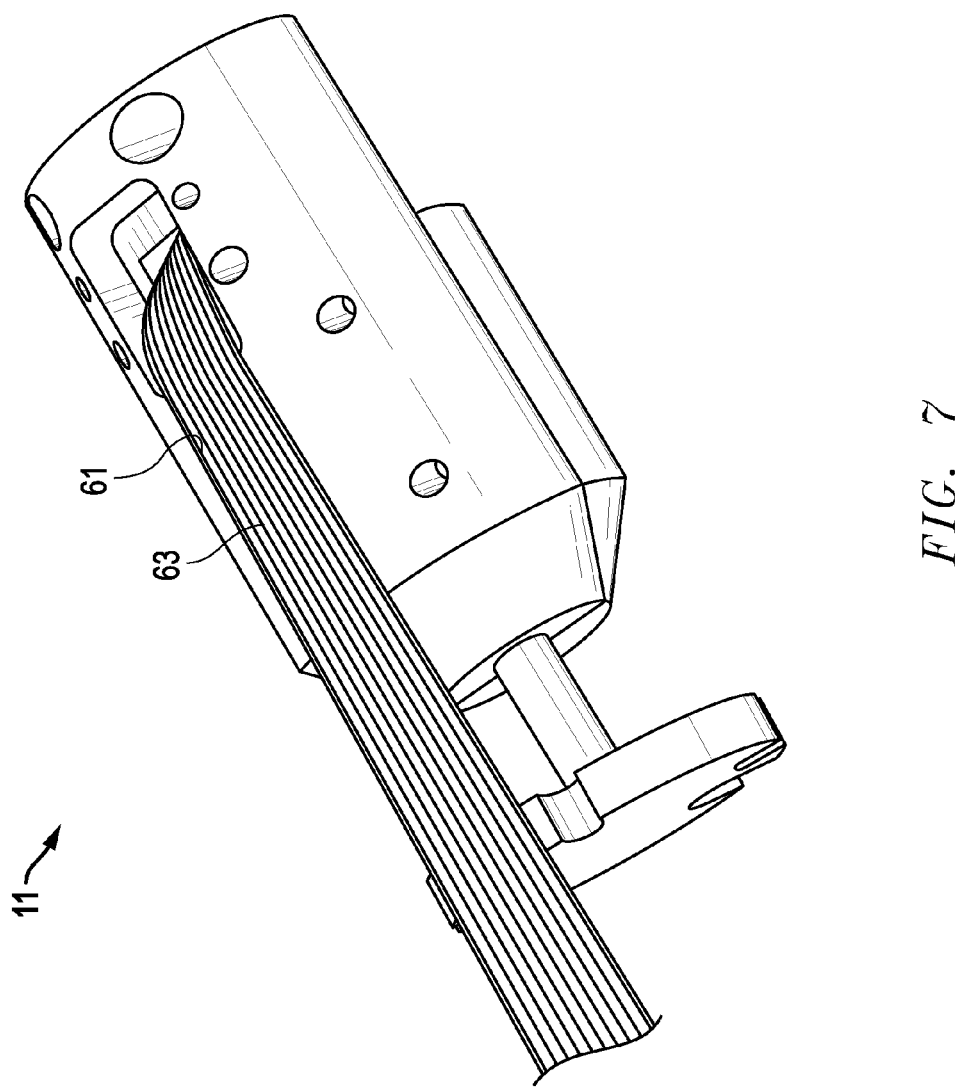
FIG. 7 is an isometric view of another embodiment of an apparatus.

In operation (FIG. 6), embodiments of apparatus 11 may be included in a down hole tool assembly 51. For example, the down hole tool assembly 51 may comprise a series of tubular members such as a pressure barrel 53. A first component 55 (such as electronics, a battery, etc.) may be mounted inside the pressure barrel 53. The apparatus or snubber 11 may be mounted to the first component 55 inside the pressure barrel 53. The snubber 11 may comprise any of the features, elements and components as described herein. A second component 57 (such as a measurement while drilling (MWD) component) may be mounted to the snubber 11 opposite the first component 55. Second component 57 may be mounted to snubber 11 via flange 25, in some embodiments. The housing 13 may comprise an exterior with a flat cable profile 61 (FIG. 7) that is adapted to accept and protect a cable 63 (e.g., a flat cable, a flat bundle of cables, etc.) extending beyond apparatus 11 to the other components.

Embodiments of the housing 13 may include features to permit the mounting of an electrical connector to allow power and communication to pass into or out of first component 55. The flange 25 may include a slot or other hole to allow the passage of the cable 63, a bundle of cables, etc., past the mounting feature and on to other operational components.

Still other components, such as a pulser, an MWD signal transmitter, etc. (not shown), may be located down hole from second component 57, while other components and vessels may be located up hole from first component 55. More than one snubber 11 may be employed in down hole tool assembly 51. The one or more snubbers 11 act to reduce the shock and vibration transmitted to the various components in the assembly. Embodiments of the snubbers 11 are particularly adept at providing an internal suspension system to protect sensitive electronics (such as the MWD equipment) from shock and vibration. Embodiments of the snubbers are suitable for use with agitators and PDC drill bits to significantly reduce the g force on equipment compared to conventional hard snubbers.

In some embodiments, the piston 19 in the snubber 11 may have a range of axial travel in one direction of at least about 0.020 inches. For example, the range of axial travel of the piston 19 in one direction may be at least about 0.050 inches, such as at least about 0.100 inches, or even at least about 0.200 inches. In some versions, the maximum amount of axial travel of the piston 19 in one direction may be about 0.250 inches. In some versions, the piston 19 may have a range of axial travel in one direction of at least about 0.100 inches with an axial load of about 170 lbs. Embodiments of the snubber 11 may comprise an overall axial length of less than about 4 inches, such as about 3.25 inches.

In addition, some embodiments of the snubber 11 may resist torsional rotation of the piston 19. For example, the piston 19 may have a range of torsional rotation of about 1 degree to about 7 degrees. The torsional rotation of piston 19 may be limited by the non-cylindrical shape of piston 19 and chamber 17. In contrast, conventional snubbers employ a pin that extends between their housing and their piston to resist torsional rotation of their piston. Some embodiments of snubber 11 do not have such a pin.

In still other embodiments, a snubber for reducing shock and vibration in down hole tools may comprise a housing having an axis and a chamber. A piston may be mounted in the chamber for axial movement therein. The piston may include a shaft extending therefrom to an exterior of the housing. An axial spring element may be mounted between the piston and the housing. Both the piston and the chamber may comprise non-cylindrical portions. In some versions, each of the non-cylindrical portions may include at least one flat side to restrict torsional rotation of the piston about the axis within the chamber. Each of the non-cylindrical portions may be polygonal.

Embodiments of the axial spring element may have a variable density in an axial direction. The axial spring element may have a variable spring rate. The axial spring element may include a continuously variable spring rate that is directly proportional to axial displacement of the piston. The axial spring element may comprise polygonal elements. The polygonal elements may be located on both axial sides of the axial spring element. The polygonal elements on each axial side of the axial spring element may be oriented perpendicular to each other.

Embodiments of the snubber may further comprise a second axial spring element. Both the axial spring element and the second axial spring element may comprise polygonal elements. The polygonal elements of the axial spring element may be oriented in an opposite axial direction as the polygonal elements of the second axial spring element. The axial spring element may not comprise a completely solid volume between the piston and the chamber. The axial spring element may be profiled to include air space within an interior of a volumetric envelope of the axial spring element.

Embodiments of the snubber may further comprise at least one radial spring element. The radial spring element may be mounted between the piston and the chamber in the housing, and may be configured for reciprocal axial motion therein. In addition, the piston may include a range of axial travel in one direction of at least about 0.020 inches. The snubber may comprise a spring rate of about 1200 lb/in to about 5000 lb/in, with a 3 lb object oscillating at 2 G's.

Additional embodiments of a snubber for reducing shock and vibration in down hole tools may comprise a housing having an axis and a chamber; a piston mounted in the chamber for axial movement therein, the piston having a shaft extending therefrom to an exterior of the housing; and an axial spring element mounted between the piston and the housing, and the axial spring has a variable spring rate.

Some embodiments of a down hole tool assembly may comprise a pressure barrel; a first component mounted inside the pressure barrel; a snubber mounted to the first component inside the pressure barrel, the snubber comprising: a housing having an axis and a chamber; a piston mounted in the chamber for axial movement therein, the piston having a shaft extending therefrom to an exterior of the housing; an axial spring element mounted between the piston and the housing; and both the piston and the chamber comprise non-cylindrical portions; and a second component mounted the snubber opposite the first component.

In still other embodiments, the device may primarily comprise three metallic parts, three spring elements and fasteners. The two-part housing may be fastened together to form the housing of the snubber. The piston/shaft is contained inside the housing and has a protrusion which may be fastened to the body of the MWD tool. One part of the housing permits the electronics, battery, etc., to be fastened to the snubber.

The piston element may be provided with a rectangular boss and contained within the housing of the snubber. The boss may be constrained on top and bottom by two elastomeric spring elements. These elements may be shaped such that they include protrusions that are tapered in shape. The tapered shape may enable the spring rate at low displacement to be very low, which may keep the natural frequency low. Such embodiments may allow the snubber to shield the electronics from a significant amount of vibration. In some embodiments, as the displacement or magnitude of the impacts or vibration increases the spring rate increases. In turn, this means that the system becomes stiffer and more vibration is passed on to the electronics. In addition, this means that the overall displacement of the piston relative to the housing may be kept within the chamber of the snubber.

Another feature of the piston in some embodiments is the roughly rectangular profile. The cross section of the housing that the piston sits in is a slightly larger rectangular shape. The piston may be offset from the wall of the housing by a third elastomeric spring element that circumscribes the piston.

This configuration allows for a small amount of angular impact to be absorbed as well and means that the device is significantly more resistant to the failure of the angular constraint than conventional designs.

Embodiments of the shock absorber or snubber may be used in an MWD module. The snubber may be attached to electronics, batteries, etc., in the MWD module, and to a part of the body of the MWD tool that will move or vibrate with the drill string on the other end. To reduce the impact experienced by the electronic section, the snubber may be used to fasten the two pieces together. These elements may be encased in a pressure barrel that will protect the electronics from the high pressure liquid that is present down hole. In some examples, the MWD tool may contain several of these modules (e.g., generally 3 to 6 modules).

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A snubber for reducing shock and vibration in down hole tools in oil and gas wells, comprising:
   a housing having an axis and a chamber, and the housing is configured to be coupled to a first down hole tool;
   a piston mounted in the chamber for axial movement therein, the piston having a shaft extending therefrom to an exterior of the housing, and the piston is configured to be coupled to a second down hole tool;
   a first axial spring element mounted between one side of the piston and the housing;
   a second axial spring element mounted between another side of the piston and the housing, wherein the another side and the one side are opposite each other; and
   both the piston and the chamber comprise radial section profiles, relative to the axis, that are non-cylindrical.

2. The snubber of claim 1, wherein each of the non-cylindrical radial section profiles include at least one flat side to restrict torsional rotation of the piston about the axis within the chamber.

3. The snubber of claim 1, wherein each of the non-cylindrical radial section profiles is rectangular.

4. The snubber of claim 1, wherein the first and second axial spring elements are formed from an elastomer.

5. The snubber of claim 1, wherein the first and second axial spring elements have a variable spring rate based on a geometry thereof in an axial direction.

6. The snubber of claim 1, wherein the first and second axial spring elements have a continuously variable spring rate that is directly proportional to axial displacement of the piston, and the first and second axial spring elements are formed from hydrogenated nitrile butadiene rubber (HNBR).

7. The snubber of claim 1, wherein the first and second axial spring elements comprise axially tapered protrusions.

8. The snubber of claim 7, wherein the axially tapered protrusions are on both axial sides of the first and second axial spring elements, and taper in opposite axial directions.

9. The snubber of claim 8, wherein the axially tapered elements comprise prisms on each axial side of the first and second axial spring elements, and the prisms on each axial side are oriented perpendicular to each other.

10. The snubber of claim 7, wherein the axially tapered protrusions of the first axial spring element are oriented in an opposite axial direction as the axially tapered protrusions of the second axial spring element.

11. The snubber of claim 1, wherein the first and second axial spring elements comprise a nitrile elastomer.

12. The snubber of claim 1, further comprising at least one radial spring element mounted on a radial surface of the piston, relative to the axis, and radially between the piston and the chamber in the housing.

13. The snubber of claim 1, wherein the first and second axial spring elements comprise cone-shaped elements.

14. The snubber of claim 1, wherein the first and second axial spring elements are profiled to include air space within an interior of a volumetric envelope thereof, and the first and second axial spring elements do not comprise a coil spring.

15. The snubber of claim 1, wherein the piston has a range of axial travel in one direction of at least about 0.020 inches in one direction, and a maximum range of travel of about 0.250 inches in one direction.

16. The snubber of claim 1, wherein the snubber comprises a spring rate of about 1200 lb/in to about 5000 lb/in.

17. A snubber for reducing shock and vibration in down hole tools in oil and gas wells, comprising:
- a housing having an axis and a chamber, and the housing is configured to be coupled to a first down hole tool;
- a piston mounted in the chamber for axial movement therein, the piston having a shaft extending therefrom to an exterior of the housing, and the piston is configured to be coupled to a second down hole tool;
- a first axial spring element mounted between one side of the piston and the housing;
- a second axial spring element mounted between another side of the piston and the housing, wherein the another side and the one side are opposite each other;
- the first and second axial spring elements formed from an elastomer; and
- the first and second axial springs have a variable spring rate based on a geometry thereof in an axial direction.

\* \* \* \* \*